3,161,612
ALKYLATED AMINO PHENOLS PROTECTING
RUBBER GOODS AGAINST OZONE
Kurt Ley, Leverkusen, Friedrich Lober, Leverkusen-Bayerwerk, Theo Kempermann, Cologne-Lindenthal, and Hans Pohle, Leverkusen, Germany, assignors to Farbenfabriken Bayer Aktiengesellschaft, Leverkusen, Germany, a corporation of Germany
No Drawing. Filed Apr. 13, 1960, Ser. No. 21,897
Claims priority, application Germany Apr. 15, 1959
6 Claims. (Cl. 260—45.9)

This invention relates to new antiozonants and to new methods for their production.

It is a well known fact that everyday articles manufactured from natural and synthetic rubbers by vulcanization are liable to crack when the surfaces thereof are placed under mechanical stress, whether due to elongation, compression or shearing, and the surfaces are at the same time exposed for a relatively long period to the influence of the atmosphere, for example during storage. It is also known that the ozone present in small concentration in the atmosphere is responsible for these cracks, and that more especially the choice of the elastomer used for the article in question is of great importance as regards the resistance to this type of crack formation. For example, wholly or substantially saturated elastomers, such as silicone rubber and butyl rubber, are quite resistant to such degradation phenomena. In contrast thereto, the types of elastomers which are most susceptible to cracking are just those which are used on a large scale in the rubber industry, namely natural rubber and butadiene-styrene synthetic rubber. Butadiene-acrylonitrile synthetic rubber is also very readily susceptible to cracking due to ozone. It is consequently necessary to protect such elastomers against the action of the ozone, by means of ozone preservatives. For a long time, there have been used for this purpose certain wax combinations which are incorporated into the elastomers. It is true that these exert a certain protective action but only when the protective wax film which forms on the surface of the article remains completely intact. Under dynamic stresses, however, the film is easily broken and the ozone cracks formed at these defective points tend to become deeper and wider than those formed without wax. However, even when the wax film is intact, the protection is incomplete, since a small quantity of ozone still penetrates through the film and eventually causes cracks.

It consequently represented a great technical advance to discover that derivatives of p-phenylene diamine are compounds which, when added to the rubber in relatively small proportions, greatly reduce the attack of the ozone and considerably prolong the effective life of the article. However, all effective compounds of this type which have hitherto been discovered become discolored under the action of light, so that they can only be incorporated into articles containing carbon black.

It has now been found that compounds of the general formula

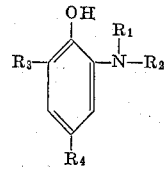

Formula 1 are especially suitable for portecting vulcanizates of natural and synthetic rubber against the action of ozone. In the aforementioned formula $R_1$ and $R_2$ each represent a hydrocarbon radical containing up to 16 carbon atoms, which may be substituted. $R_1$ can also be a hydrogen atom, and $R_2$ a radical of the formula

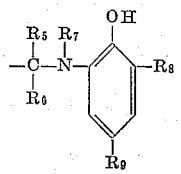

Formula 2

$R_3$, $R_4$, $R_8$ and $R_9$ each represent a hydrocarbon radical containing from 4 to 9 carbon atoms, the carbon atom adjacent the ring only being substituted by hydrocarbon radicals, and the radicals $R_5$, $R_6$ and $R_7$ each represent a hydrogen atom or a hydrocarbon radical containing up to 16 carbon atoms.

The particular advantage of the aforementioned compounds is that they are not discolored or only slightly discolored under the action of light.

Examples of suitable compounds to be used according to the invention are:

2-methylamino-4,6-di-tert.-butyl phenol,
  M.P. 103–104° C.
2-ethylamino-4,6-di-tert.-butyl phenol, M.P. 83–84° C.
2-n-propylamino-4,6-di-tert.-butyl phenol,
  M.P. 152–155° C. (chlorohydrate)
2-butylamino-4,6-di-tert.-butyl phenol,
  M.P. 176–177.5° C. (chlorohydrate)
2-sec.-butylamino-4,6-di-tert.-butyl phenol,
  M.P. 88–89° C.
2-tert.-butylamino-4,6-di-tert.-butyl phenol,
  M.P. 103–104° C.
2-cyclohexylamino-4,6-di-tert.-butyl phenol,
  M.P. 105–107° C.
2-o-methylphenylamino-4,6-di-tert.-butyl phenol,
  M.P. 118–119° C.
2-allylamino-4,6-di-tert.-butyl phenyl,
  B.P.$_{0.13}$ 111–114° C.
2 - (γ - dimethylamino - propylamine) - 4,6 - di - tert.-butyl phenol, M.P. 199–203° C.
2-β-hydroxyethylamino-4,6-di-tert.-butyl phenol,
  M.P. 99–100.5° C.
2-(γ-hydroxypropylamino)-4,6-di-tert.-butyl phenol,
  M.P. 170–173° C.

2-ethylamino-4,6-di-(α-methylcyclohexyl-) phenol,
B.P.$_{20}$ 253° C.
2-n-propylamino-4,6-di(α-methylcyclohexyl) phenol,
B.P.$_{20}$ 260–262° C.
2-cyclohexylamino-4,6-di-(α-methylcyclohexyl)-phenol,
B.P.$_{22}$ 185–195° C.
2-ethylamino-4,6-di-tert.-amyl phenol,
B.P.$_{15}$ 180–188° C.
2-tert.-butylamino-4,6-di-tert.-amyl phenol,
M.P. 50–52° C.
2-pyrenylamino-(3)-4,6-di-tert.-butyl phenol,
M.P. starting at 255° C.
2-(p-methylphenylamino-4,6-di(α-methylcyclohexyl)-phenol, M.P. 109–110° C.
2-(p-methoxyphenylamino-4,6-(α-methylcyclohexyl) phenol, M.P. 104–105° C.
2,2'-dihydroxy-3,5,3',5'-tetra-tert.-butyl-diphenylamine,
M.P. 124–129° C.
2-(p-methylphenylamino)-4,6-di-tert.-butyl phenol,
M.P. 151–152° C.
2-(o-methylphenylamino)-4,6-di-tert.-butyl phenol,
M.P. 118–119° C.
2-(m-methylphenylamino)-4,6-di-tert.-butyl phenol,
M.P. 119–121° C.
2-(3,5-dimethylphenylamino)-4,6-di-tert.-butyl phenol,
M.P. 140–142° C.
2-(p-methoxyphenylamino)-4,6-di-tert.-butyl phenol,
M.P. 136–138° C.
2-(o-methoxyphenylamino)-4,6-di-tert.-butyl phenol,
M.P. 118–120° C.
2-(m-methoxyphenylamino)-4,6-di-tert.-butyl phenol,
M.P. 128–129° C.
2-(4-methyl-5-methoxyphenylamino)-4,6-di-tert.-butyl phenol, M.P. 139–140° C.
2-(2-methyl-5-methoxyphenylamino)-4,6-di-tert.-butyl phenol, M.P. 99–102° C.
2-(p-ethoxyphenylamino)-4,6-di-tert.-butyl phenol,
M.P. 111–113° C.
2-(o-ethoxyphenylamino)-4,6-di-tert.-butyl phenol,
M.P. 115–117° C.
2-(p-chlorophenylamino)-4,6-di-tert.-butyl phenol,
M.P. 155–156° C.
2-(m-chlorophenylamino)-4,6-di-tert.-butyl phenol,
M.P. 124–126° C.
2-(o-phenoxyphenylamino)-4,6-di-tert.-butyl phenol,
M.P. 127–129° C.
2-(β-naphthylamino)-4,6-di-tert.-butyl phenol,
M.P. 168–178° C.
2-methylamino-4,6-di-(α-methylcyclohexyl)phenol,
B.P.$_{20}$ 255–257° C.
2-phenylamino-4,6-di-tert.-butyl phenol,
M.P. 150–152° C.
2-N-methyl-N-phenylamino-4,6-di-tert.-butyl phenol,
M.P. 80–82° C.
N,N'-methylene-bis-[4,6-di-tert.-butyl-2(N-ethyl)] aminophenol, M.P. 67–68° C.
N,N'-methylene-bis[4,6-di-tert.-butyl-2-(N-n-propyl)] aminophenol, B.P.$_{22}$ 183–187° C.
N,N'-methylene-bis[4,6-di-tert.-butyl-2-(N-tert.-butyl)] aminophenol, M.P. 71–74° C.
N,N'-methylene-bis[4,6-di-tert.-butyl-2-(N-isobutyl)] aminophenol, B.P.$_{17}$ 185–187° C.
N,N'-methylene-bis[4,6-di-tert.-butyl-2-(N-cyclohexyl)] aminophenol, M.P. 95–96° C.
N,N'-methylene-bis[4,6-α-methylcyclohexyl-2-(N-cyclohexyl)]-aminophenol, B.P.$_{15}$ 265–275° C.
N,N'-methylene-bis[4,6-α-methylcyclohexyl-2-(N-ethyl)]-aminophenol, B.P.$_{19}$ 250–252° C.
N,N'-methylene-bis[4,6-α-methylcyclohexyl-2-(N-methyl)]aminophenol, B.P.$_{16}$ 240–245° C.
N,N'-methylene-bis-(2-methylamino-4,6-di-tert.-butyl phenol), B.P.$_{15}$ 165–168° C.
N,N'-methylene-bis(2-n-butylamino-4,6-di-tert.-butyl phenol), B.P.$_{18}$ 184–185° C.
N,N'-C-methyl-methylene-bis-(2-cyclohexylamino-4,6-di-tert.-butyl phenol), B.P.$_{39}$ 210–215° C.
N,N'-C-isopropyl-methylene-bis-(2-methylamine-4,6-di-tert.-butyl phenol), B.P.$_{16}$ 165–170° C.
2-(N-p-tolyl-N-methyl)-amino-4,6-di-tert.-butyl phenol, M.P. 92–93° C.
2-(N-o-tolyl-N-methyl)amino-4,6-di-tert.-butyl phenol, M.P. 82–83° C.
2-(N-p-anisyl-N-methyl)-amino-4,6-di-tert.-butyl phenol, M.P. 93–94.5° C.
2-(N-o-anisyl-N-methyl)-amino-4,6-di-tert.-butyl phenol, B.P.$_{19}$ 238–240° C.

The compounds used for the new process can be obtained by reacting 1,2-dihydroxybenzene which is substituted in the 4-position and 6-position by the aforementioned radicals $R_3$, $R_4$, $R_8$ and $R_9$ which are sterically hindering groups with a primary amine in the presence of oxygen, for example atmospheric oxygen, and—if desired—subsequent alkylation. If $R_2$ is a radical of the aforementioned Formula 2, the reaction products are further reacted with carbonyl groups containing compounds such as formaldehyde, acetaldehyde or isobutyraldehyde.

Examples of suitable substituted 1,2-dihydroxybenzenes are 4,6-di-tert.-butyl-pyrocatechol,
4,6-di-(1-methyl-cyclohexyl)-pyrocatechol,
4,6-di-tert.-amyl-pyrocatechol,
4,6-di-tert.-octyl-pyrocatechol,
4,6-di-tert.-dodecyl-pyrocatechol,
6-tert.-butyl-4-tert.-amyl-pyrocatechol,
4-tert.-octyl-6-tert.-butyl-pyrocatechol,
4-tert.-6-(1-methyl-cyclohexyl)-pyrocatechol,
4-tert.-butyl-6-tert.-amyl-pyrocatechol and
4-(1-methyl-cyclohexyl)-6-tert.-butyl-pyrocatechol.

Suitable amines are ammonia and primary saturated or unsaturated aliphatic and cycloaliphatic monoamines or polyamines such as methylamine, ethylamine, n-propylamine, n-butylamine, sec.-butylamine, tert.-butylamine, allylamine, cyclohexylamine, ethanolamine, propanolamine and arylamines, such as aniline, 4-methylaniline, 2-methylaniline, 3-methylaniline, 3,5-dimethylaniline, 4-ethylaniline, 4-methoxyaniline, 2-ethoxyaniline, 1-methyl-2-methoxy-4-aminobenzene, 1-methyl-4-methoxy-2-aminobenzene, 2-phenoxyaniline, 4-chloraniline, 3-chloraniline, β-naphthylamine, 3-aminopyrene and 6-hydroxy-3,5-di-tert.-butylaniline.

The new process is preferably carried out in an inert solvent or diluent, such as benzine fractions, benzene, toluene or xylene. In some cases it is also advisable to carry out the process in the presence of an alcohol as diluent. It is, however, also possible to carry out the process in the presence of water.

The reaction is preferably carried out at temperatures below 60° C., advantageously at room temperature or slightly elevated temperature, since the yields at higher temperatures always fall considerably. Generally speaking, it is sufficient if the hydroxybenzenes are reacted with the primary amines in an equimolecular ratio. In many cases, it is preferable to employ the amines in excess, for example up to 2 mols of amine per mol of hydroxy compound. When the process is carried out in the presence of oxygen this may be supplied by introducing air into the reaction mixture. Generally speaking, with relatively small batches, the air contact which is produced by stirring the reaction mixture is quite adequate. If the reaction is effected with arylamines, it is expedient to work in the presence or a secondary or tertiary amine or an inorganic base, such as an alkali metal hydroxide. Examples of suitable aliphatic secondary and tertiary amines are triethylamine, dibutylamine, dicyclohexylamine, piperazine, morpholine, methyl morpholine, tributylamine, piperidine and methyl piperidine. It is usually sufficient to add a catalytic quantity of the secondary or tertiary amine or inorganic base. In some cases, it is, however, possible to obtain an increased yield by employing higher concentrations of amine or inorganic base.

In carrying out the process according to the present invention, a salt is initially formed. These salts can in many cases be isolated in crystalline form, for example when using diamines, and can be used as such in the process of the invention. In the further reaction, there is an intermediate stage consisting in the formation of deep colored radical anions, which were detected by means of paramagnetic electron resonance.

The compounds obtained according to the invention can be worked up by conventional methods. The o-aminophenols which are obtained can also be isolated in the form of their salts, from which the free compounds can be obtained in the usual manner by treatment with an alkali.

The compounds used according to the invention are generally clear, viscous and sparingly volatile liquids or solid crystalline compounds having a weak aromatic odor. They can be easily dispersed in rubber mixtures and can be used in combination with any of the commonly employed rubber auxiliaries (for example vulcanization accelerators, vulcanizers, antioxidizing agents, plasticizers, fillers, dyestuffs, etc.) without the latter being deleteriously affected as regards their specific action.

The proportion of the new products in the rubber is between about 0.4 and 6% by weight, preferably from about 1 to 4% by weight, based on the polymer content. They do not impair the vulcanization or the mechanical values of the vulcanizate and do not show any or only a very slight discoloration on exposure to light. Blooming limits vary, but are so high that the quantities necessary for effective protection against ozone can always be incorporated. The incorporation of the compounds used according to the invention in the vulcanizate results in an improved stabilization against the action of ozone and in a longer life of rubber goods exposed to ozone.

Examples of high polymers which may be stabilized against the action of ozone by the compounds of the invention are natural rubber and synthetic rubber-like polymers which contain double bonds and which have been obtained for example from conjuated diolefins, such as butadiene, dimethyl butadiene, isoprene and their homologues, or copolymers of such conjugated diolefins with polymerizable vinyl compounds, such as styrene, α-methylstyrene, acrylonitrile, methacrylonitrile, acrylates or methacrylates or copolymers which are obtained from iso-olefins, such as isobutylene or its homologues with small quantities of conjugated diolefins.

Other examples of high polymers which can be stablized by the compounds of the invention are polymers from chlorobutadiene and copolymers of chlorobutadiene with monoolefins and/or diolefins of polymerizable vinyl compounds.

The new compounds can be used in mixtures with light-colored fillers where non-discoloration is important and also in mixtures filled with carbon black, with which it is desired for example that there should be no contact stain of adjacent materials.

The following examples further illustrate the invention without, in any way, limiting it thereto; the parts given are by weight.

EXAMPLE 1

The following mixtures of the type used for the white side walls of automobile tyres were prepared on a mill:

|  | 1A, parts | 1B, parts |
| --- | --- | --- |
| Pale crepe | 100 | 100 |
| Zinc oxide | 25 | 25 |
| Titanium dioxide | 45 | 45 |
| Active silica filler | 10 | 10 |
| Magnesium carbonate | 5 | 5 |
| Pariffin | 1.5 | 1.5 |
| Stearic acid | 1 | 1 |
| Sulfur | 2.6 | 2.6 |
| Dibenzothiazyl disulfide | 0.2 | 0.2 |
| S-benzothiazyl-N-cyclohexylsulfenamide | 0.6 | 0.6 |
| 2-sec.-butylamino-4,6-di-tert.-butyl phenol |  | 3.0 |

Test elements having the dimensions 0.4 x 4.5 x 4.5 cm. were vulcanized from the aforementioned mixtures 1A and 1B (press vulcanization, 20 minutes at 151° C.). Each 3 test elements were then so clamped in a plastic frame that elongations of 10%, 20% and 30% were obtained at the surface. The test elements stretched in this way were treated at room temperature with an air stream containing 25 parts of ozone to 100 million parts of air. The rate of flow was 4 cubic meters per hour and the total experiment time was 100 hours. The crack formation was evaluated at certain intervals as indicated in the following table, namely, both the total number of cracks visible to the naked eye and also their average length, in accordance with the following outline.

Number of cracks:
  No crack _____ 0
  1-3 cracks _____ 1
  4-20 cracks _____ 2
  21-100 cracks _____ 3
  More than 100 cracks _____ 4

Average length of cracks:
  No measurement _____ 0
  Length up to 1 mm. _____ 1
  Length between 1-3 mm. _____ 2
  Length between 3-8 mm. _____ 3
  Length more than 8 mm. _____ 4

In the following table, the two values are separated by a vertical stroke, the value for the number of cracks always appearing first and transistions being indicated by fractions.

Table 1

| Mixture | Elongation, percent | Evaluation after hours | | | | | | |
| --- | --- | --- | --- | --- | --- | --- | --- | --- |
|  |  | 1 | 10 | 20 | 30 | 40 | 60 | 100 |
| 1A | 10 | 0/0 | 3/2 | 3/2 | 3/2 | 3/2.5 | 3/3 | 3/3.5 |
|  | 20 | 0/0 | 3/1.5 | 3/2 | 3/2 | 3/2 | 3/2.5 | 3/3 |
|  | 30 | 0/0 | 3.5/1.5 | 3.5/1.5 | 3.5/2 | 3.5/2 | 3.5/2 | 3.5/2.5 |
| 1B | 10 | 0/0 | 0/0 | 0/0 | 0/0 | 0/0 | 0/0 | 0/0 |
|  | 20 | 0/0 | 0/0 | 0/0 | 0/0 | 0/0 | 0/0 | 2/1.5 |
|  | 30 | 0/0 | 0/0 | 0/0 | 0/0 | 0/0 | 0/0 | 3/1.5 |

The 2-sec.-butylamino-4,6-di-tert.-butyl phenol which was used was prepared as follows:

66.6 grams of 4,6-di-tert.-butyl pyrocatechol were suspended in 450 ml. of light benzine and 22.2 g. of isobutylamine were added. Complete solution quickly occurred, the reaction mixture becoming blue in color. The mixture was then stirred for 7 hours in an open reaction vessel. After drying with sodium sulfate, the solvent was removed in vacuo and the residue solidified. On being dissolved and allowed to crystallise from light benzine, there were quickly formed colorless crystals having a melting point 88–89° C.

Melting point of the hydrochloride 187–192° C. (with decomposition).

Yield: 60 g.=72% of the theoretical.

Analysis for the hydrochloride, $C_{18}H_{32}ONCL$: (Molecular weight, 313.5). Calculated: C, 68.90%; H, 10.20%;

N, 4.46%; Cl, 11.32%. Found: C, 68.9%; H, 10.2%; N, 4.5%; Cl 11.3%.

EXAMPLE 2

The following mixtures of the type used for play balls were prepared on a mill:

|  | 2A, parts | 2B, parts |
|---|---|---|
| Pale crepe | 100 | 100 |
| Whiting | 100 | 100 |
| Glycol | 1 | 1 |
| Stearic acid | 1 | 1 |
| Active silica filler | 10 | 10 |
| Zinc oxide | 10 | 10 |
| Sulfur | 2.75 | 2.75 |
| Dibenzothiazyl disulfide | 0.7 | 0.7 |
| Diphenyl guanidine | 0.3 | 0.3 |
| 2-sec.-butylamino-4,6-di-tert.-butyl phenol |  | 3.0 |

Press cure: 20 minutes at 151° C.

The test was carried out in the same way as described in Example 1 and the results are set out in Table 2.

Table 2

| Mixture | Elongations, percent | Evaluation after hours |  |  |  |  |  |  |  |
|---|---|---|---|---|---|---|---|---|---|
|  |  | 1 | 5 | 10 | 15 | 20 | 30 | 40 | 60 |
| 2A | 10 | 0/0 | 4/1 | 4/1 | 3.5/1.5 | 3.5/1.5 | 3.5/2 | 3.5/2 | 3.5/2.5 |
|  | 20 | 0/0 | 0/0 | 4/1 | 4/1 | 4/1.5 | 4/2 | 4/2 | 4/2 |
|  | 30 | 0/0 | 0/0 | 4/1 | 4/1 | 4/1.5 | 4/2 | 4/2 | 4/2 |
| 2B | 10 | 0/0 | 0/0 | 0/0 | 0/0 | 0/0 | 0/0 | 0/0 | 4/1 |
|  | 20 | 0/0 | 0/0 | 0/0 | 0/0 | 0/0 | 4/1 | 4/1 | 4/1 |
|  | 30 | 0/0 | 0/0 | 0/0 | 0/0 | 0/0 | 4/1 | 4/1 | 4/1 |

EXAMPLE 3

The following mixtures were prepared on a mill:

|  | 3A, parts | 3B, parts | 3C, parts | 3D, parts | 3E, parts |
|---|---|---|---|---|---|
| Pale crepe | 100 | 100 | 100 | 100 | 100 |
| Whiting | 160 | 160 | 160 | 160 | 160 |
| White factice | 15 | 15 | 15 | 15 | 15 |
| Zinc oxide | 10 | 10 | 10 | 10 | 10 |
| Dibenzothiazyl disulfide | 1 | 1 | 1 | 1 | 1 |
| Hexamethylene tetramine | 0.25 | 0.25 | 0.25 | 0.25 | 0.25 |
| 2-ethylamino-4,6-ditert.-butyl phenol |  | 3 |  |  |  |
| 2-sec.-butylamino-4,6-di-tert.-butyl phenol |  |  | 3 |  |  |
| 2-n-propylamino-4,6-di-tert.-butyl phenol |  |  |  | 3 |  |
| 2-cyclohexylamino-4,6-di-tert.-butyl phenol |  |  |  |  | 3 |

Press cure: 20 minutes at 151° C.

The test was carried out in the same way as described in Example 1, except that 200 parts, instead of 25 parts, of ozone were used per 100 million parts of air. The following results were observed:

The compounds used according to the invention and contained in the mixtures 3B, 3D, and 3E were prepared in the following manner:

(a) *2-ethylamino-4,6-di-tert.-butyl phenol.*—66.6 grams of 4,6-di-tert.-butyl pyrocatechol were suspended in 450 ml. of light benzine and 39 g. of a 39% solution of ethylamine in water were added. Stirring was continued as in Example 1 and the solvent was removed after separating the aqueous layer and drying the organic layer with sodium sulfate. The solidified residue was dissolved and allowed to crystallize from isopropanol-water. Colorless crystals having a melting point of 83–84° C. were obtained.

Yield: 62 g.=83% of the theoretical.

*Analysis.*—$C_{16}H_{27}ON$: (Molecular weight, 249). Calculated: C, 77.10%; H, 10.84%; N, 5.62%. Found: C, 77.2%; H, 10.7%; N, 5.6%.

(b) *2-n-propylamino-4,6-di-tert.-butyl phenol.*—66.6 grams of 4,6-di-tert.-butyl-pyrocatechol were suspended in 450 ml. of light benzine and 18 g. of n-propylamine were added. Stirring was continued for 5 hours and the product was worked up as described in Example 1. The residue was distilled in vacuo (B.P. $_{18\ mm.\ Hg}$: 179–181° C.). The oily distillate slowly solidified. The melting point of the hydrochloride was 152–155° C.

Yield: 64 g.=80% of the theoretical.

Analysis for the hydrochloride, $C_{17}H_{30}ONCl$: (Molecular weight, 299.5). Calculated: C, 68.11%; H, 10.01%; N, 4.67%. Found: C, 68.1%; H, 10.1%; N, 4.66%.

(c) *2-cyclohexylamino-4,6-di-tert.-butyl phenol.*—66.6 grams of 4,6-di-tert.-butyl-pyrocatechol were suspended in 450 ml. of light benzine and 29.7 g. of cyclohexylamine were added. Stirring was continued for 7 hours and after distilling off the solvent, there remained a bluish-white crystal magma. Upon being dissolved and allowed to recrystallize from ethanol, a colorless substance was obtained with a melting point of 105–107° C.

Yield: 69 g.=76.5% of the theoretical.

*Analysis.*—$C_{20}H_{33}ON$: (Molecular weight, 303). Calculated: C, 79.20%; H, 10.89%; N, 4.62%. Found: C, 79.2%; H, 10.8%; N, 4.5%.

Table 3

| Mixture | Elongation, percent | Evaluation after hours |  |  |  |  |  |  |  |  |
|---|---|---|---|---|---|---|---|---|---|---|
|  |  | 0.5 | 1 | 2 | 4 | 6 | 10 | 15 | 20 | 25 |
| 3A | 10 | 0/0 | 4/1 | 4/1 | 4/1 | 4/1.5 | 4/2 | 4/2.5 | 4/3 | 4/3 |
|  | 20 | 0/0 | 4/1 | 4/1 | 4/1 | 4/1.5 | 4/2 | 4/2.5 | 4/3 | 4/3 |
|  | 30 | 0/0 | 0/0 | 4/1 | 4/1 | 4/1.5 | 4/2 | 4/2 | 4/2.5 | 4/3 |
| 3B | 10 | 0/0 | 0/0 | 0/0 | 0/0 | 0/0 | 0/0 | 0/0 | 0/0 | 0/0 |
|  | 20 | 0/0 | 0/0 | 0/0 | 0/0 | 0/0 | 0/0 | 0/0 | 4/1 | 4/1 |
|  | 30 | 0/0 | 0/0 | 0/0 | 0/0 | 0/0 | 0/0 | 0/0 | 4/1 | 4/1.5 |
| 3C | 10 | 0/0 | 0/0 | 0/0 | 0/0 | 0/0 | 0/0 | 0/0 | 4/1 | 4/1 |
|  | 20 | 0/0 | 0/0 | 0/0 | 0/0 | 0/0 | 0/0 | 0/0 | 0/0 | 4/1.5 |
|  | 30 | 0/0 | 0/0 | 0/0 | 0/0 | 4/1 | 4/1 | 4/1 | 4/1.5 | 4/1.5 |
| 3D | 10 | 0/0 | 0/0 | 0/0 | 0/0 | 0/0 | 0/0 | 0/0 | 0/0 | 0/0 |
|  | 20 | 0/0 | 0/0 | 0/0 | 0/0 | 0/0 | 0/0 | 0/0 | 0/0 | 0/0 |
|  | 30 | 0/0 | 0/0 | 0/0 | 0/0 | 0/0 | 0/0 | 0/0 | 0/0 | 0/0 |
| 3E | 10 | 0/0 | 0/0 | 0/0 | 0/0 | 4/1 | 4/1 | 4/1 | 4/1.5 | 4/1.5 |
|  | 20 | 0/0 | 0/0 | 0/0 | 0/0 | 0/0 | 4/1 | 4/1 | 4/1 | 4/1 |
|  | 30 | 0/0 | 0/0 | 0/0 | 0/0 | 0/0 | 0/0 | 0/0 | 0/0 | 0/0 |

EXAMPLE 4

(a) The following mixtures were prepared on a mill:

|  | 4A, parts | 4B, parts | 4C, parts | 4D, parts | 4E, parts | 4F, parts | 4G, parts |
|---|---|---|---|---|---|---|---|
| Pale crepe | 100 | 100 | 100 | 100 | 100 | 100 | 100 |
| Whiting | 160 | 160 | 160 | 160 | 160 | 160 | 160 |
| White factice | 15 | 15 | 15 | 15 | 15 | 15 | 15 |
| Dibenzothiazyl-disulfide | 1 | 1 | 1 | 1 | 1 | 1 | 1 |
| Zinc oxide | 10 | 10 | 10 | 10 | 10 | 10 | 10 |
| Hexamethylene tetramine | 0.25 | 0.25 | 0.25 | 0.25 | 0.25 | 0.25 | 0.25 |
| 2-n-dodecylamie-4,6-di-tert.-butyl-phenol |  | 3 |  |  |  |  |  |
| 2-phenyl-amino-4,6-di-tert.-butyl-phenol |  |  | 3 |  |  |  |  |
| N-methyl-2-hydroxy-4'-methyl-3,5-di-tert.-butyl-diphenylamine) |  |  |  | 3 |  |  |  |
| N,N'-methylene-bis-(2-n-proplylamino-4,6-di-tert. butyl phenol) |  |  |  |  | 3 |  |  |
| N,N'-C-methyl-methylene-bis-(2 cyclohexylamino-4,6-di-tert.-butyl phenol) |  |  |  |  |  | 3 |  |
| N,N'-C-isopropyl-methylene-bis-(2-methylamino-4,6-di-tert.-butyl-phenol) |  |  |  |  |  |  | 3 |

Press cure: 20 minutes at 151° C.

The test was carried out as described in Example 1 and the results are set out in Table 4.

Table 4

| Mixture | Elongation, percent | Evaluation after hours |  |  |  |  |  |  |
|---|---|---|---|---|---|---|---|---|
|  |  | 1 | 10 | 20 | 30 | 40 | 60 | 100 |
| 4A | 10 | 0/0 | 4/1 | 4/1 | 4/1 | 4/1 | 4/2 | 4/2 |
|  | 20 | 0/0 | 0/0 | 4/1 | 4/1 | 4/1 | 4/2 | 4/2.5 |
|  | 30 | 0/0 | 0/0 | 4/1 | 4/1 | 4/1.5 | 4/2 | 4/2.5 |
| 4B | 10 | 0/0 | 0/0 | 0/0 | 0/0 | 0/0 | 0/0 | 4/1 |
|  | 20 | 0/0 | 0/0 | 0/0 | 0/0 | 0/0 | 4/1 | 4/1 |
|  | 30 | 0/0 | 0/0 | 0/0 | 0/0 | 0/0 | 4/1 | 4/1 |
| 4C | 10 | 0/0 | 0/0 | 0/0 | 0/0 | 0/0 | 0/0 | 0/0 |
|  | 20 | 0/0 | 0/0 | 0/0 | 0/0 | 0/0 | 0/0 | 3/1 |
|  | 30 | 0/0 | 0/0 | 0/0 | 0/0 | 0/0 | 4/1 | 4/1 |
| 4D | 10 | 0/0 | 0/0 | 0/0 | 0/0 | 0/0 | 0/0 | 3/1.5 |
|  | 20 | 0/0 | 0/0 | 0/0 | 0/0 | 4/1 | 4/1.5 | 4/2 |
|  | 30 | 0/0 | 0/0 | 0/0 | 3/1 | 4/1.5 | 4/1.5 | 4/2 |
| 4E | 10 | 0/0 | 0/0 | 0/0 | 0/0 | 0/0 | 0/0 | 0/0 |
|  | 20 | 0/0 | 0/0 | 0/0 | 0/0 | 0/0 | 0/0 | 3/1 |
|  | 30 | 0/0 | 0/0 | 0/0 | 0/0 | 0/0 | 3/1 | 3/1.5 |
| 4F | 10 | 0/0 | 0/0 | 0/0 | 0/0 | 0/0 | 0/0 | 0/0 |
|  | 20 | 0/0 | 0/0 | 0/0 | 0/0 | 0/0 | 0/0 | 4/1 |
|  | 30 | 0/0 | 0/0 | 0/0 | 0/0 | 4/1 | 4/1 | 4/1.5 |
| 4G | 10 | 0/0 | 0/0 | 0/0 | 0/0 | 0/0 | 0/0 | 4/1.5 |
|  | 20 | 0/0 | 0/0 | 0/0 | 0/0 | 0/0 | 0/0 | 0/0 |
|  | 30 | 0/0 | 0/0 | 0/0 | 0/0 | 0/0 | 0/0 | 0/0 |

(b) The 2-dodecylamino-4,6-di-tert.-butyl phenol was prepared in the following manner:

66.6 grams of 4,6-di-tert.-butyl pyrocatechol were suspended in 450 ml. of light benzine. 55.5 grams of dodecylamine were added thereto and the mixture stirred for 7 hours. The solution was dried with sodium sulfate and the solvent extracted in vacuo, leaving a reddish-oil. The compound was employed without further purification.

*Analysis.*—$C_{26}H_{47}ON$: (Molecular weight, 389). Calculated: C, 80.21%; H, 12.08%; N, 3.60%. Found: C, 80.7%; H, 11.5%; N, 4.0%.

The 2-phenylamino-4,6-di-tert.-butyl phenol was obtained as follows:

(c) 66.6 grams of 4,6-di-tert.-butyl-pyrocatechol were suspended in 450 cc. of light benzine. 3 grams of triethylamine were added and 28 grams of aniline in 100 ml. of light benzine were then run in. The mixture was stirred for 5 hours in an open reaction vessel. After extracting the solvent, the solid residue was recrystallized from washing benzine. The colorless crystals obtained melted at 150–152° C.

*Analysis.*—$C_{20}H_{27}ON$: (Molecular weight, 297). Calculated: C, 80.81%; H, 9.09%; N, 4.71%. Found: C, 81.00%; H, 9.1%; N, 5.0%.

(d) The N - methyl - 2 - hydroxy-4'-methyl-3,5-di-tert.-butyl diphenylamine was obtained as follows:

30 grams of 4,6-di-tert.-butyl-2-(N-p-tolyl)-aminophenol were dissolved under nitrogen in 120 ml. of acetone and 12.6 grams of dimethyl sulfate were added. 8 cc. of a 50% caustic potash solution were then introduced dropwise while stirring, after which stirring was continued for 20 minutes and the mixture was poured on to ice. An oil, which immediately solidified, separated out. On being dissolved and crystallized from methanol, crystals having a melting point of 92–93° C. were obtained.

EXAMPLE 5

(a) The following mixtures of the type used for play balls were prepared on a mill:

|  | 5A parts | 5B parts |
|---|---|---|
| Pale crepe | 100 | 100 |
| Whiting | 160 | 160 |
| White factice | 15 | 15 |
| Zinc oxide | 10 | 10 |
| Dibenzothiazyl disulfide | 1 | 1 |
| Hexamethylene tetramine | 0.25 | 0.25 |
| N,N'-methylene-bis-(2-tert.-butylamino-4,6-di-tert.-butylphenol) |  | 3.0 |

Press cure: 20 minutes at 151° C.

The test was carried out as described in Example 1, with the difference that the vulcanizates were exposed to natural weather conditions instead of to an artificial ozone atmosphere. The results are set out in Table 5.

Table 5

| Mixture | Elongation, Percent | Evaluation after days |  |  |  |  |
|---|---|---|---|---|---|---|
|  |  | 2 | 8 | 15 | 22 | 29 |
| 5A | 10 | 0/0 | 3/1.5 | 3/1.5 | 3/2 | 3/2 |
|  | 20 | 0/0 | 3/2 | 3/2 | 3/2 | 4/2.5 |
|  | 30 | 0/0 | 3/2 | 3/2 | 3/2 | 4/2.5 |
| 5B | 10 | 0/0 | 0/0 | 0/0 | 0/0 | 0/0 |
|  | 20 | 0/0 | 0/0 | 0/0 | 0/0 | 0/0 |
|  | 30 | 0/0 | 0/0 | 0/0 | 0/0 | 0/0 |

(b) The N,N' - methylene-bis-(2-tert.-butylamino-4,6-di-tert.-butyl phenol) was obtained as follows:

70 grams of 4,6-di-tert.-butyl-2-(N-tert.-butyl)-aminophenol were dissolved in 700 cc. of methanol and 14 g. of 30% aqueous formaldehyde were added. 3 drops of concentrated hydrochloric acid were then added and the mixture heated at boiling point for 15 minutes. After cooling, water was added and the product separated out was dissolved and crystallized from methanol. The resulting colorless crystals melted at 71–74° C.

In analogous manner the compounds mentioned under 4E and 4G are prepared by using acetaldehyde (4F) respectively isobutyric aldehyde (4G).

The N,N' - methylene - bis - (2-n-propylamino-4,6-di-tert.-butyl phenol) used in Example 4 was obtained in a corresponding manner.

EXAMPLE 6

The following mixture was prepared on a mill:

| | 6A, parts | 6B, parts | 6C, parts | 6D, parts |
|---|---|---|---|---|
| Pale crepe | 100.0 | 100.0 | 100.0 | 100.0 |
| Zinc oxide | 35.0 | 35.0 | 35.0 | 35.0 |
| Whiting | 35.0 | 35.0 | 35.0 | 35.0 |
| Stearic acid | 1.0 | 1.0 | 1.0 | 1.0 |
| Titanium dioxide | 10.0 | 10.0 | 10.0 | 10.0 |
| Dibenzothiazyl disulfide | 0.9 | 0.9 | 0.9 | 0.9 |
| Hexamethylene tetramine | 0.2 | 0.2 | 0.2 | 0.2 |
| Active silica filler | 10.0 | 10.0 | 10.0 | 10.0 |
| Ethylene glycol | 1.0 | 1.0 | 1.0 | 1.0 |
| Sulfur | 2.2 | 2.2 | 2.2 | 2.2 |
| N,N'-methylene-bis-(2-methyl-amino-4,6-di-tert.-butyl phenol) | | 3.0 | | |
| N,N'-methylene-bis-(2-amino-4,6-di-tert.-butylphenol) | | | 3.0 | |
| N,N'-methylene-bis-[2-ethylamino-4,6-di-($\alpha$-methylcyclohexyl)-phenol] | | | | 3.0 |

Press cure: 20 minutes at 151° C.

The test was carried out as described in Example 1. The results are set out in Table 6.

Table 6

| Mixture | Elongation, percent | Evaluation after hours | | | | | | |
|---|---|---|---|---|---|---|---|---|
| | | 1 | 10 | 20 | 30 | 40 | 60 | 100 |
| 6A | 10 | 4/1 | 4/2 | 4/2 | 4/2 | 4/2.5 | 3/3 | 3/3.5 |
| | 20 | 4/1 | 4/2 | 4/2 | 4/2 | 4/2.5 | 4/2.5 | 4/3 |
| | 30 | 0/0 | 4/1 | 4/1.5 | 4/1.5 | 4/2 | 4/2.5 | 4/2.5 |
| 6B | 10 | 0/0 | 0/0 | 0/0 | 0/0 | 3/2 | 3/2 | 3/2.5 |
| | 20 | 0/0 | 0/0 | 0/0 | 0/0 | 3/1.5 | 3/1.5 | 3/2 |
| | 30 | 0/0 | 0/0 | 0/0 | 0/0 | 4/1.5 | 4/1.5 | 4/1.5 |
| 6C | 10 | 0/0 | 0/0 | 0/0 | 0/0 | 0/0 | 0/0 | 0/0 |
| | 20 | 0/0 | 0/0 | 0/0 | 0/0 | 0/0 | 0/0 | 0/0 |
| | 30 | 0/0 | 4/1 | 4/1 | 4/1 | 4/1.5 | 4/2 | 4/2 |
| 6D | 10 | 0/0 | 0/0 | 0/0 | 0/0 | 0/0 | 0/0 | 0/0 |
| | 20 | 0/0 | 0/0 | 0/0 | 0/0 | 0/0 | 0/0 | 0/0 |
| | 30 | 0/0 | 0/0 | 3/1 | 4/1 | 4/1 | 4/1.5 | 4/1.5 |

We claim:

1. A novel compound having a formula selected from the group consisting of

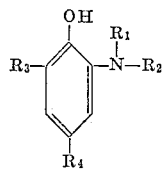

and

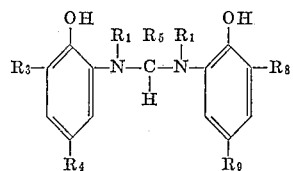

wherein $R_1$ is selected from the group consisting of a saturated hydrocarbon radical containing up to 16 carbon atoms and hydrogen, $R_2$ is a saturated hydrocarbon radical containing up to 16 carbon atoms, and wherein $R_3$, $R_4$, $R_8$, and $R_9$ each represent a saturated hydrocarbon radical containing from 4–9 carbon atoms, the carbon atom of the hydrocarbon radicals $R_3$, $R_4$, $R_8$, and $R_9$ which is adjacent to the aromatic nucleus only being substituted by additional hydrocarbon radicals, and wherein $R_5$ represents a member selected from the group consisting of a hydrogen atom and a saturated hydrocarbon radical containing 1–6 carbon atoms.

2. As a new composition of matter an elastomer containing as an antiozonant the compound of claim 1, said elastomer being selected from the group consisting of natural rubber, homopolymers of conjugated diolefins, homopolymers of chlorobutadiene, copolymers of conjugated diolefins with polymerizable compounds, and copolymers of chlorobutadiene with polymerizable compounds, said polymerizable compounds being selected from the group consisting of styrene, alpha-methyl styrene, acrylonitrile, methacrylonitrile, and an isoolefin.

3. The composition of claim 1 wherein the elastomer is natural rubber.

4. N,N'-methylene-bis-(2-amino-4,6-di-tert.-butyl phenol).

5. N,N'-methylene-bis-(2-methylamino-4,6-di-tert.-butyl phenol).

6. N,N'-methylene-bis-(2-tert.-butylamino-4,6-di-tert.-butyl phenol).

References Cited in the file of this patent

UNITED STATES PATENTS

| 2,220,065 | Clarkson | Nov. 5, 1940 |
| 2,270,215 | Fitch | Jan. 12, 1942 |
| 2,652,367 | Adelson | Sept. 15, 1953 |
| 2,666,791 | Weinmayr | Jan. 19, 1954 |
| 2,967,852 | Frese | Jan. 10, 1961 |

FOREIGN PATENTS

| 771,635 | Great Britain | Apr. 3, 1957 |